United States Patent [19]
Rowson

[11] Patent Number: 5,187,784
[45] Date of Patent: Feb. 16, 1993

[54] INTEGRATED CIRCUIT PLACEMENT METHOD USING NETLIST AND PREDETERMINED ORDERING CONSTRAINTS TO PRODUCE A HUMAN READABLE INTEGRATED CIRCUIT SCHEMATIC DIAGRAM

[75] Inventor: James A. Rowson, Fremont, Calif.

[73] Assignee: VLSI Technology, Inc., San Jose, Calif.

[21] Appl. No.: 297,353

[22] Filed: Jan. 13, 1989

[51] Int. Cl.$^5$ .............................................. G06F 15/20
[52] U.S. Cl. ........................... 395/500; 364/917.96; 364/221.2; 364/972.3; 364/962.1; 364/DIG. 1; 364/491
[58] Field of Search ............... 395/500; 364/488, 489, 364/490, 491, 200 MS File, 900 MS File

[56] References Cited

U.S. PATENT DOCUMENTS

| | | | |
|---|---|---|---|
| 3,617,714 | 4/1969 | Kernighan | 235/150 |
| 4,484,292 | 11/1984 | Hong | 364/491 |
| 4,495,559 | 1/1985 | Gellatt | 364/148 |
| 4,577,276 | 3/1986 | Dunlop | 364/491 |
| 4,593,363 | 6/1986 | Burstein | 364/491 |
| 4,630,219 | 12/1986 | DiGiacomo | 364/488 |
| 4,635,208 | 1/1987 | Coleby | 364/491 |
| 4,638,442 | 1/1987 | Bryant | 364/489 |
| 4,686,629 | 8/1987 | Noto et al. | 364/488 |
| 4,700,317 | 10/1987 | Watanabe | 364/488 |
| 4,768,154 | 8/1988 | Sliwkowski | 364/491 |
| 4,791,578 | 12/1988 | Fazso | 364/488 |
| 4,815,003 | 3/1989 | Putatanada | 364/491 |
| 4,852,015 | 7/1989 | Doyle | 364/488 |
| 4,852,016 | 7/1989 | McGehee | 364/490 |
| 4,896,272 | 1/1990 | Kurosawa | 364/491 |
| 4,908,772 | 3/1990 | Chi | 364/490 |
| 4,922,432 | 5/1990 | Kobayashi | 364/488 |
| 4,967,367 | 10/1990 | Piednoir | 364/490 |

OTHER PUBLICATIONS

"A Linear-Time Heuristic for Improving Network Partitions" Fiduccia, C. M. and Mattheyses, R. M.; *19th Design Automation Conference;* pp. 241–247.

*Primary Examiner*—Thomas C. Lee
*Assistant Examiner*—Eric Coleman
*Attorney, Agent, or Firm*—Burns, Doane, Swecker & Mathis

[57] ABSTRACT

A method is disclosed for determining the placement of circuit elements in an integrated circuit where the circuit elements are initially represented by a netlist. The method preferably includes the steps of providing predetermined ordering constraints that indicate the preferred relative locations of the circuit elements that are represented in the netlist, partitioning the circuit elements from the netlist in accordance with a predetermined balancing criterion; determining the value of a cost function associated with the partitioning steps, and selecting a particular partition based upon the value of the cost function.

5 Claims, 3 Drawing Sheets

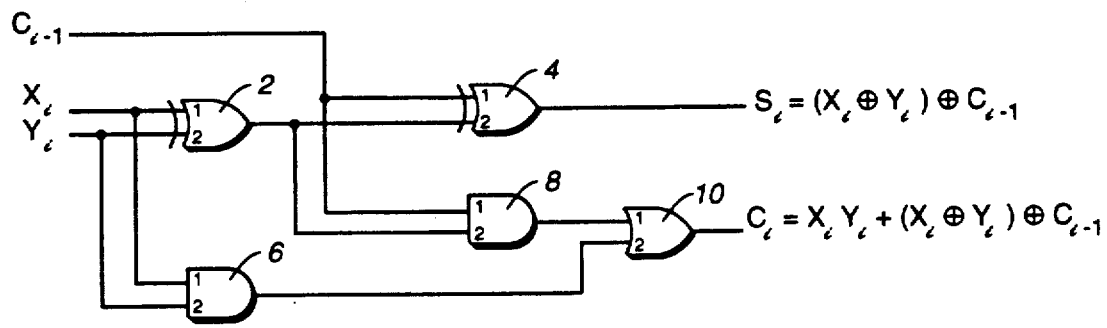
FIG._1
(PRIOR ART)
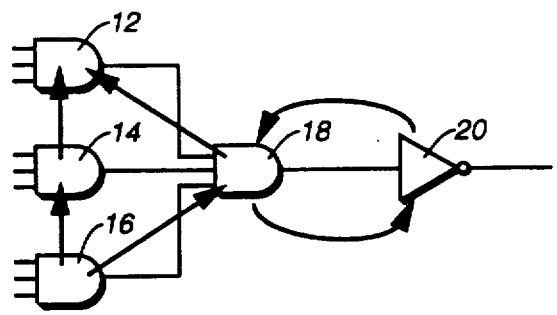
FIG._2

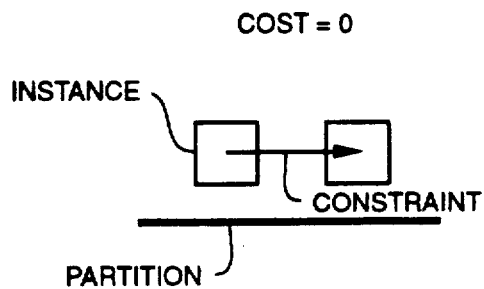
FIG._3A
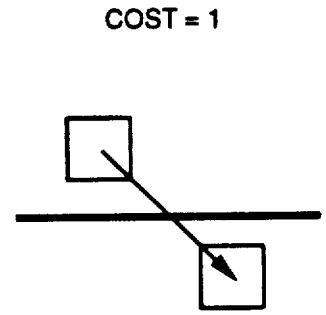
FIG._3B
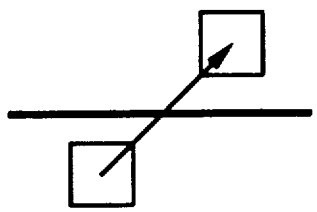
FIG._3C
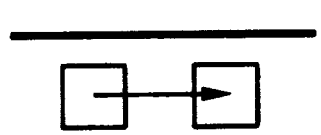
FIG._3D

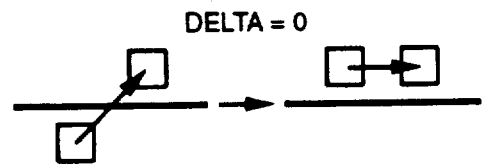
FIG._4A
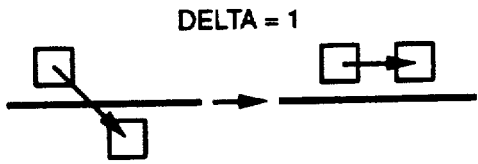
FIG._4B
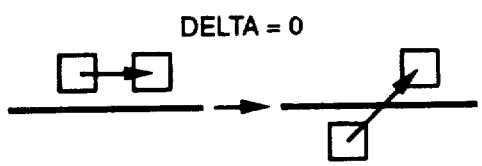
FIG._4C
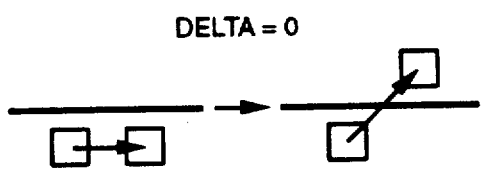
FIG._4D
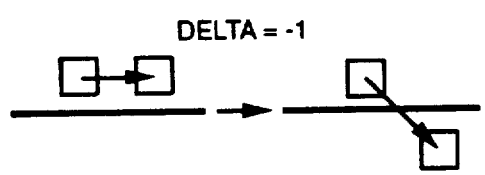
FIG._4E
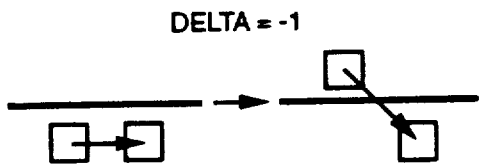
FIG._4F
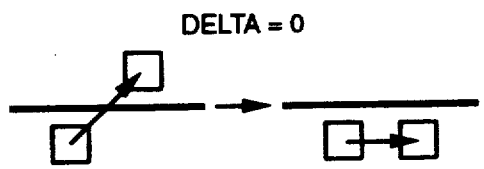
FIG._4G
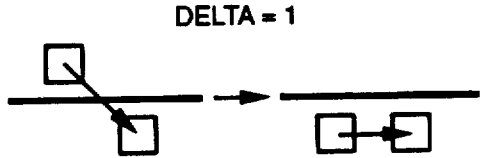
FIG._4H

INTEGRATED CIRCUIT PLACEMENT METHOD USING NETLIST AND PREDETERMINED ORDERING CONSTRAINTS TO PRODUCE A HUMAN READABLE INTEGRATED CIRCUIT SCHEMATIC DIAGRAM

BACKGROUND OF THE INVENTION

The present invention generally relates to a technique for automatically determining placement information for electronic circuit elements or the like. More particularly, the present invention relates to a technique for producing, from a given netlist, placement information for schematic circuit diagrams which may be read and/or edited by a human.

Generally speaking, a netlist provides information concerning the number and types of elements in a circuit and the manner in which they are interconnected. For example, a netlist might include a list of circuit element terminals connected on a common net. Thus, if a first AND gate receives one input from an inverter and a second input from an OR gate, and provides an output to both a NOR gate and a second AND gate, the netlist would indicate that a first net includes the inverter and the first AND gate. A second net would include the OR gate and the first AND gate. Finally, a third net would include the first AND gate, the NOR gate, and the second AND gate. It should be understood, however, that netlists are not restricted to use in describing logic diagrams. In a netlist, the interconnected circuit elements, typically referred to as cells, may be as simple as a resistor, or as complex as a microprocessor.

Netlists may be generated in a variety of ways. One common manner in which a netlist is produced is as a result of logic synthesis generation. Stated briefly, a logic synthesis tool may receive as an input a Boolean function expressed in terms of a state table, and generate a netlist including the logic circuits and the interconnections which would implement the given Boolean function.

A netlist could also be produced as an output from a typical datapath compiler. A datapath compiler will usually receive a high level schematic as an input, and produce a netlist output providing more detailed circuit information. For example, a high level schematic may include a datapath element such as a carry-save array multiplier. The datapath compiler may produce a standard netlist representing a carry-save array multiplier cell taken from a library of such cells, which standard netlist would be incorporated into the netlist of the overall circuit.

Although a netlist provides detailed interconnection information, there is no cell placement information in a netlist. As far as the netlist is concerned, two interconnected cells may be immediately adjacent with one another, or may be separated physically by hundreds or even thousands of other cells.

Techniques are known for determining cell placement based upon a given netlist. These techniques, disclosed for example in U.S. Pat. No. 3,617,714 to Kernighan et al. and in an article by C.M. Fiduccia et al., "A Linear-Time Heuristic For Improving Network Partitions," *Proceedings of the 19th ACM Design Automation Conference* (1982), generally relate to optimized circuit layout for a physical support such as a printed circuit board or a semiconductor substrate. However, a layout optimized for a physical support usually bears little resemblance to a schematic diagram suitable for human comprehension.

It is often desirable to provide a human-readable schematic circuit diagram of a circuit represented by a netlist. Such a schematic circuit diagram permits circuit designers to comprehend the circuit design and, if necessary, edit the design to correct errors or optimize operating efficiency. Accordingly, it is an object of the present invention to provide a technique for producing placement information for human-readable schematic circuit layouts from a given netlist.

BRIEF SUMMARY OF THE INVENTION

Briefly, the present invention provides ordering constraints indicating preferred relative locations of circuit elements represented in a netlist. The circuit elements represented in the netlist are partitioned in accordance with a predetermined balancing criterion, and a cost value associated with the partition is determined. The cost value is preferably a function of the number of nets crossing the partition. The cost value is adjusted in accordance with the ordering constraints. The circuit elements are then repartitioned and a second adjusted cost value is determined. The adjusted cost values are compared to determine the better partition. The partitioned circuit elements may be repartitioned recursively to produce subpartitions. Placement information represented by the partitions is thus optimized for presentation of the circuit in a schematic drawing.

BRIEF DESCRIPTION OF THE DRAWING

The objects, advantages and features of the present invention will become apparent from the following detailed description, when read in light of the accompany drawing, wherein:

FIG. 1 is a typical schematic logic diagram showing a full adder circuit presented in a form which is readily readable by a human;

FIG. 2 is an illustrative schematic logic diagram demonstrating cell placement constraints in accordance with the present invention; and FIGS. 3A–D and 4A–H the effects of the cell placement constraints illustrated in FIG. 2 in accordance with the present invention.

DETAILED DESCRIPTION OF THE PREFERRED EMBODIMENT

The present invention is described in the context of generating, from a netlist, circuit element placement information for a schematic logic diagram. It should be appreciated, however, that the principles of the present invention are applicable to generating placement information for human-readable circuit diagrams having other types of circuit elements.

A conventional full adder circuit is shown schematically in FIG. 1. This circuit is well known in the art and the detailed operation of the circuit need not be discussed here. However, the illustrated circuit is useful in discussing certain features of a schematic drawing which are useful in aiding human comprehension of a circuit's function. As an example of such a feature, signal flow in a schematic logic diagram is conventionally left to right. Although this convention is sometimes broken, it is generally observed. Thus, a human may trace signal flow in a schematic logic diagram by moving from left to right. The following additional features also said comprehension of circuit structure and function:

(1) circuit elements which are interconnected should be as close as possible to one another;
(2) signal line crossings should be minimized; and
(3) bends in the signal lines should be minimized.

As illustrated in FIG. 1, these features help clarify the functional structure of the adder circuit. Of course, other features which said readability by humans will be appreciated by the ordinarily skilled artisan.

The conventional full adder circuit illustrated in FIG. 1 includes a first NOR gate 2, a second NOR gate 4, a first AND gate 6, a second AND gate 8, and an OR gate 10. In operation, the adder circuit of FIG. 1 adds bits $X_i$ and $Y_i$ and a carry bit $C_{i-1}$ from a previous add operation to produce a sum $S_i$. Additionally, the full adder circuit produces a new carry bit $C_i$.

The full adder circuit of FIG. 1 might be expressed as indicated in Table 1. Although the interconnection information apparent in FIG. 1 is present in Table 1, as with a netlist there is no placement information in Table 1 which would show the relative positions of the individual cells or the routing of signals between cells.

TABLE 1

| Cell | Inputs | Outputs |
|---|---|---|
| NOR gate 2 | Terminal 1 = $X_i$ | Terminal 2 of NOR 4 |
| | Terminal 2 = $Y_i$ | Terminal 2 of AND 8 |
| NOR gate 4 | Terminal 1 = $C_{i-1}$ | Sum Output |
| | Terminal 2 = Output of NOR 2 | |
| AND gate 6 | Terminal 1 = $Y_i$ | Terminal 2 of OR 10 |
| | Terminal 2 = $Y_i$ | |
| AND gate 8 | Terminal 1 = $C_{i-1}$ | Terminal 1 of OR 10 |
| | Terminal 2 = Output of NOR 2 | |
| OR gate 10 | Terminal 1 = Output of AND 8 | Carry Output |
| | Terminal 1 = Output of AND 6 | |

In accordance with the present invention, it is possible to generate human-readable logic diagrams (such as FIG. 1) from a netlist which includes no relative placement information. This may be achieved by generating constraints based upon characteristics which make schematic diagrams more readily readable. These constraints may be used in a modified "mincut" technique to produce a human-readable schematic diagram from a netlist.

Standard mincut techniques are well known in the art, and are fully disclosed in the Kernighan et al. patent and in the C.M. Fiduccia et al. article noted above. These references are hereby incorporated by reference. Stated briefly, a traditional mincut technique begins with a netlist and no placement information. The mincut technique recursively splits the input netlist in half, attempting to minimize the number of nets that cross the partition while maintaining balance between the two halves according to some predetermined criterion.

Normally a cell is moved from one side of the partition to the other and the resulting change is evaluated to determine whether the number of nets crossing the partition is increased, decreased, or remains unchanged. Only "legal" moves, i.e. moves which do not violate the balancing criterion, are allowed, and each cell is moved once, and only once, per pass of the recursive algorithm. The cell movement which most improves (or least degrades) the "cost" of the partition, measured by the number of nets which cross the partition, is selected as the best move. Whenever the algorithm locates a balanced partition with a cost better than any balanced partition previously located, that partition is saved as the optimal partition, and is used as the standard for evaluating subsequent partitions.

Once a partition is selected for the overall netlist, the process is repeated for the individual halves previously partitioned. That is, the process is repeated to determine an optimal further partition for the cells located on each side of a previous partition. The process continues recursively until, for example, each cell is separated from the other cells by a partition. The partitions then provide cell placement information by which the interconnection costs of the connected cells are minimized.

Schematic diagrams require some cells to be arranged in a particular order. Thus, for a schematic drawing to be readily comprehended by a human it is necessary to do more than minimize interconnection costs. Referring now to FIG. 2, it is important, for example, that the instances driving inputs to a gate be ordered visually on the schematic in the same order as the inputs to the gate. That is, AND gates 12, 14 and 16, which are the instances that drive the inputs of AND gate 18, should be stacked vertically in the order of the input terminals of AND gate 18.

In FIG. 2, the ordering constraints are illustrated by arrows, where an arrow from a first instance to a second instance indicates that the first instance should be arranged below the second instance. When one instance should be vertically aligned with a second instance, such as with AND gate 18 and inverter 20, the instances are constrained to be below each other. Of course, in addition to the vertical ordering constraints illustrated in FIG. 2, it is possible to provide horizontal ordering constraints to account for desired signal flow from left to right.

These ordering constraints may be incorporated into the mincut technique by adjusting the cost function whenever an ordering constraint is not satisfied by a selected partition. Preferably, the mincut technique recursively repartitions the netlist until there is only one instance in each partition. When the mincut technique is implemented in this manner, in accordance with the preferred embodiment of the present invention no cost penalty is assessed to a partition which places two constrained instances within a single partition. Additionally, no cost penalty is assessed to a partition which would place constrained instances in opposite partitions if the instance below the partition was constrained to be below the instance above the partition.

FIGS. 3A–D illustrates the four possible cases in which constrained instances may be arranged relative to a particular partition. As discussed above, no cost penalty is assessed to a partition which places two constrained instances within a single partition, or to a partition which places constrained instances in opposite partitions if the instance below the partition was constrained to be below the instance above the partition. Thus, the cases illustrated in parts (a), (c) and (d) of FIG. 3 have no associated cost. However, the case illustrated in part (b) of FIG. 3 has an associated cost of one.

A central part of the traditional mincut technique is maintaining an updated value indicating the cost gain (or loss) associated with moving a particular instance across a partition. In order to efficiently calculate the delta cost for each instance, the delta cost values should be updated only when necessary, and should be updated incrementally based upon the last changes made to the partition. For nets, that updating is done when an instance hooked into that net is moved. All other instances have their cost updated based upon how the net is spread across the partitions. For ordering constraints, the incremental updating is done only when one of the instances involved in the constraint is moved from one partition to the other.

The delta cost associated with moving a constrained instance depends upon both the initial and final location of the constrained instances relative to the partition. As illustrated in FIG. 3, there are four possible final configurations. Because we are concerned with two instances, one of which was just moved across the partition, each of the final configurations can be reached in two ways. Thus, there is a total of eight cases for which the delta cost (i.e. the cost gain or loss) may be affected by a move of a constrained instance across a partition.

FIGS. 4A-H illustrates the eight possible combinations of initial and final configurations of constrained instances when one instance has been moved across a partition. Whenever both the initial and final configuration satisfy the constraint, the constraint delta cost associated with the move is zero. Thus, the cases illustrated in parts (a), (c), (d) and (g) have no associated delta cost. In cases (b) and (h) a constraint which was initially unsatisfied is satisfied after the move. Thus, for these cases the constraint cost gain is one. That is, the cost associated with the move is improved by one. Finally, cases (e) and (f) move an instance so that a constraint, which was initially satisfied, is unsatisfied following the move. In these cases, the constraint delta cost in negative one, indicating a negative cost gain.

By incorporating constraint delta costs as outlined above in the mincut cost function, placement information determined by the final partitioning is optimized for human comprehension. Thus, a schematic circuit diagram drawn in accordance with that placement information should be readily understood by a circuit designer or other observer.

The technique discussed above illustrates the manner in which vertical ordering constraints affect the mincut technique when horizontal partitions are evaluated. Of course, it will readily be appreciated that horizontal ordering constraints will similarly affect the evaluation of vertical partitions.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention. For example, even though the present invention was discussed in connection with producing placement information for schematic logic diagrams, the invention is also applicable to other types of schematic circuit diagrams.

What is claimed is:

1. A computer-implemented method for placing circuit elements in an inegraded circuit schematic where the circuit elements are initially represented by a netlist to produce a human-readable schematic circuit layout from the netlist, comprising computer-implemented steps of:
   (a) receiving predetermined ordering constraints indicating preferred relative vertical locations in a schematic diagram of circuit elements that are represented in the netlist;
   (b) partitioning the circuit elements represented in the netlist in accordance with a predetermined balancing criterion;
   (c) determining a first value of a cost function associated with the partitioning produced by the partitioning step, the determined value of he cost function being dependent upon he circuit elements crossing the partitioning and the predetermined ordering constraints in the cost function;
   (d) repeating step (c) to obtain a second value of the cost function associated with a different partition;
   (e) comparing the first and second values;
   (f) selecting the partition having the lower cost value;
   (g) assigning the circuit elements to two groups such that the one group is physically above the other group in the circuit schematic; and
   (h) repeating steps (b) through (f) recursively to automatically produce horizontal subpartitions of the circuit elements represented by the netlist to produce a human readable schematic circuit layout.

2. The method of claim 1, wherein each ordering constraint has an associated cost penalty, said determining step assessing said cost penalty when a partition of said partitioning step leaves the ordering constraint unsatisfied.

3. The method of claim 1, wherein each ordering constraint provides an associated cost penalty to the value of he cost function.

4. The method of claim 3, wherein said ordering constraints relate to the horizontal locations of the circuit elements relative to one another, and said partitioning step produces vertical partitions.

5. The method of claim 4, further including a step of generating the predetermined ordering constraints to produce placement information for the circuit elements representing a predetermined directing of signal flow in the human readable schematic circuit layout.

* * * * *